(12) United States Patent
Kemmerer et al.

(10) Patent No.: US 11,270,560 B2
(45) Date of Patent: *Mar. 8, 2022

(54) VISUALLY INDICATING A WANING POWER SOURCE OF A SAFETY SENSOR

(71) Applicant: Facilasystems, LLC, Austin, TX (US)

(72) Inventors: Tina Secord Kemmerer, Austin, TX (US); Carter Wolfe, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/102,433

(22) Filed: Nov. 23, 2020

(65) Prior Publication Data

US 2021/0118272 A1 Apr. 22, 2021

Related U.S. Application Data

(63) Continuation of application No. 16/510,409, filed on Jul. 12, 2019, now Pat. No. 10,861,296, which is a continuation of application No. 15/961,436, filed on Apr. 24, 2018, now Pat. No. 10,540,865.

(60) Provisional application No. 62/491,141, filed on Apr. 27, 2017.

(51) Int. Cl.
*G08B 5/36* (2006.01)
*C09K 11/64* (2006.01)
*G08B 21/18* (2006.01)
*G08B 29/18* (2006.01)
*G08B 1/08* (2006.01)
*G08B 29/12* (2006.01)
*F21V 9/30* (2018.01)
*G08B 17/00* (2006.01)

(52) U.S. Cl.
CPC .............. *G08B 5/36* (2013.01); *C09K 11/643* (2013.01); *G08B 1/08* (2013.01); *G08B 21/182* (2013.01); *G08B 29/12* (2013.01); *G08B 29/181* (2013.01); *F21V 9/30* (2018.02); *G08B 17/00* (2013.01)

(58) Field of Classification Search
CPC .......... G08B 5/36; G08B 29/181; G08B 1/08; G08B 29/12; G08B 21/182; G08B 17/00; C09K 11/643; F21V 9/30
See application file for complete search history.

(56) References Cited

U.S. PATENT DOCUMENTS

| 4,254,304 | A | 3/1981 | Todd |
| 4,257,039 | A | 3/1981 | Webb et al. |
| 5,177,461 | A | 1/1993 | Budzyna et al. |
| 2016/0200973 | A1 | 7/2016 | Winkler |

*Primary Examiner* — Donald L Raleigh (57) ABSTRACT

An audio sound is detected. The audio sound is determined to be indicative of a power source of a safety sensor waning. Based on the determination, first light is produced based on a reaction of one or more chemicals with second light from a light emitting diode (LED), wherein the first light supplements the second light.

7 Claims, 11 Drawing Sheets

VISUALLY INDICATING A WANING POWER SOURCE OF A SAFETY SENSOR

CROSS-REFERENCE TO RELATED APPLICATIONS

This application is related to and claims priority from the following applications pursuant to 37 C.F.R. § 1.78(a) (collectively the "Parent Applications"):
a. U.S. Provisional Patent Application Ser. No. 62/491,141, filed 27 Apr. 2017, entitled Method, System, and Apparatus for Visually Indicating a Waning Power Source of a Safety Sensor.
b. U.S. Non-Provisional patent application Ser. No. 15/961,436, filed 24 Apr. 2018, entitled VISUALLY INDICATING A WANING POWER SOURCE OF A SAFETY SENSOR.
c. U.S. Non-Provisional patent application Ser. No. 16/510,409, filed 12 Jul. 2019, entitled VISUALLY INDICATING A WANING POWER SOURCE OF A SAFETY SENSOR.

The subject matter of the Parent Applications is expressly incorporated herein by reference.

TECHNICAL FIELD

The disclosure generally relates to a field of safety sensors and more particularly to determining whether a power source of a safety sensor is waning.

BACKGROUND

Smoke detectors typically have one or more power sources. For example, a smoke detector has a hardwire power source such as mains electricity which supplies AC voltage to the smoke detector. Additionally, the smoke detector has a battery power source. The smoke detector normally operates via the hardwire power source so long as the AC voltage is sufficient to operate the smoke detector. However, if the AC voltage drops below a certain voltage (e.g., due to a brownout or power outage), then the smoke detector operates using the battery power source. In another example, the smoke detector operates exclusively via the battery power source when no hardwire power source is connected to the smoke detector.

In either case, the smoke detector monitors a power level of the battery. When the power level of the battery falls to a level where the battery is not able to operate the smoke detector or reliably operate the smoke detector, the smoke detector outputs an audible sound such as a chirp. The chirp indicates that the battery in the smoke detector needs replacing. This way, with proper servicing, the smoke detector always remains functional.

BRIEF DESCRIPTION OF THE DRAWINGS

Features, aspects, and advantages of the presently disclosed technology may be better understood with regard to the following description and accompanying drawings where.

The drawings are for purpose of illustrating example embodiments, but it is understood that the inventions are not limited to the arrangements and instrumentality shown in the drawings.

DETAILED DESCRIPTION

A user may have to locate a safety sensor such as a smoke detector outputting the audible sound indicative of the power level of the battery waning under challenging conditions. The challenging conditions may include locating this safety sensor among a plurality of plurality of safety sensors in a home or business which could be outputting the audible sound. Additionally, or alternatively, the user may have to locate the safety sensor outputting the audible sound in the dark. Still additionally, or alternatively, the user may have to locate the safety sensor among a plurality of safety sensors in spaces where the audible sound echoes off walls compounding the difficulty in localization.

Existing solutions for facilitating identification of the safety sensor may involve providing, in addition to the audible indication, a visual identification that a power level of the battery has fallen below a certain level. For example, the safety sensor may emit a visible light when the power level of the battery has fallen below a certain level. The light may make finding the safety sensor easier, but such solutions rely on the same power source which is failing to power the visual identification. Powering a light bright enough to provide the visual identification is power intensive. As a result, if a power level of the power source which is to power the light is low, the visual identification is still ineffective.

Embodiments described herein are directed to an improved method, system, and apparatus for visually indicating a waning power source of a safety sensor. The power source wanes when a power level of the power source associated with the safety sensor, e.g., battery, drops below a certain level such that the safety sensor is not able to operate or might not be able to reliably operate. The visual indication of the waning power source is based on a reaction of one or more chemicals with one or more other chemicals and/or in conjunction with a light. The term chemical may include elements and/or compounds. By basing the visual identification on a reaction of the one or more chemicals, power requirements for providing the visual indication is lessened.

Figure 1:
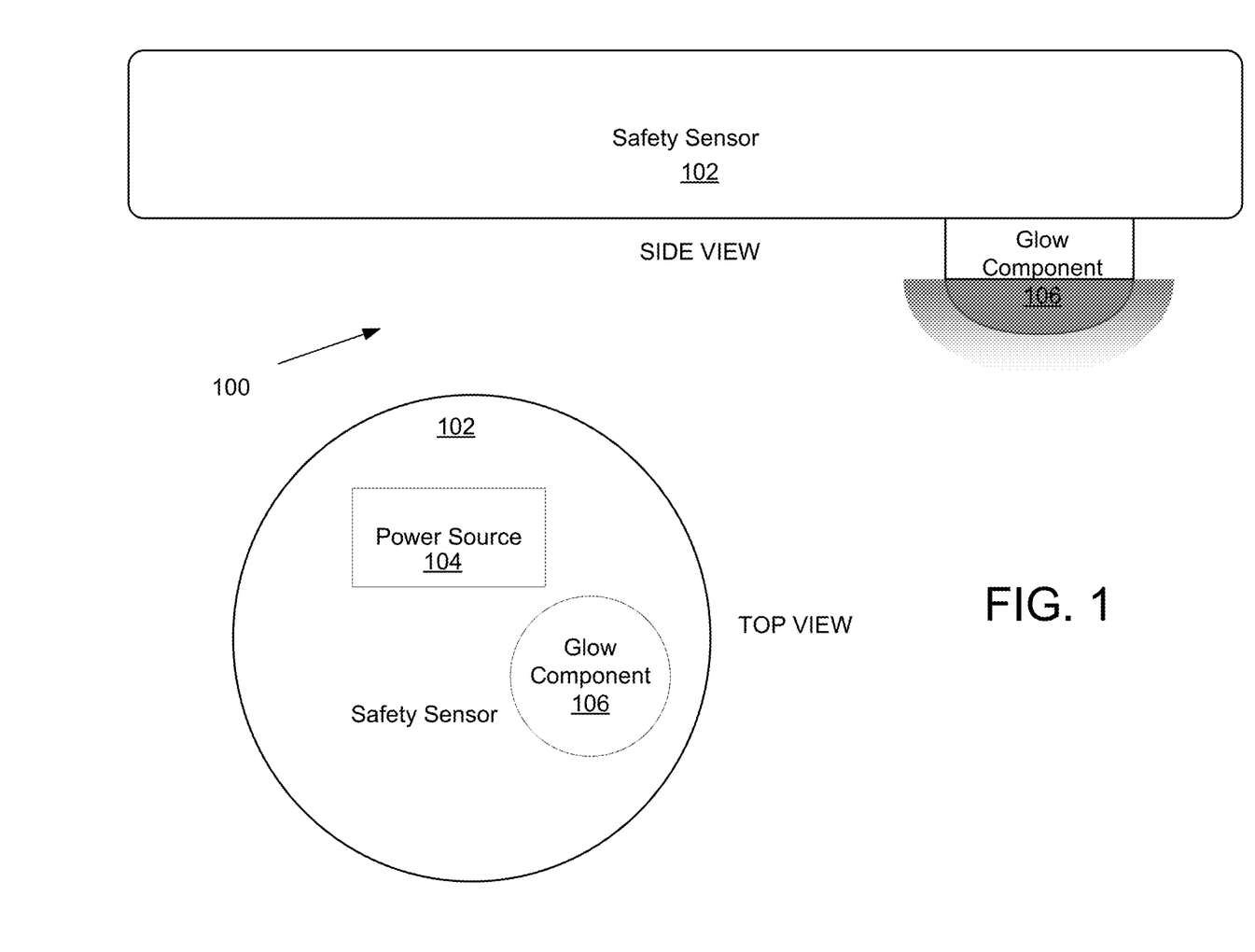
FIG. 1 shows a side view and a top view of an exemplary safety sensor with glow component.

FIG. 1 shows a side view and a top view of an exemplary safety sensor 100 having the improved visual identification.

The exemplary safety sensor 100 may comprise a safety sensor 102, a power source 104, and a glow component 106.

The safety sensor 102 may take a variety of forms including smoke detectors, fire detectors, carbon monoxide detectors, etc. among others. The power source 104 may be a battery of the safety sensor 102 and/or mains electricity which supplies AC voltage to the safety sensor 102. The safety sensor 102 may output an audible sound such as a chirp when the power level of the power source 104, e.g., battery, mains electricity, or both, falls below a certain level (e.g., wanes). The certain level may be indicative of the power source not being able to operate the safety sensor 102 or reliably operate the safety sensor 102. The audible sound may have a predefined frequency and/or periodicity. For example, the audible sound may be produced by a fixed 520 Hz square wave or range of frequencies. The audible sound may be known in the industry as a "chirp."

A glow component 106 may be affixed to the safety sensor 102. The glow component 106 may include one or more chemicals which react to provide a visual indication that the power level of a power source associated with the safety sensor 102 has fallen below a certain level. The reaction may cause the glow component 106 to emit light, i.e., glow. The light may indicate that the power source might not be able to operate the safety sensor 102 or might not be able to reliably operate the safety sensor 102 without user intervention. The user intervention may include replacing a battery or restoring mains electricity.

The glow component 106 may take a variety of different shapes and sizes. For example, the glow component 106 may be a circular shape with a diameter of 1-2 inches. The glow component 106 may be affixed to the safety sensor 102 during manufacture of the safety sensor 102 or after manufacture as an add-on, e.g., a consumer who purchases the safety sensor 102 may affix the glow component 106 to the safety sensor 102. In some examples, the glow component 106 may be mounted on the safety sensor 102 mechanically. The mechanical mounting may involve screwing or connecting the glow component 106 to a receptacle on the safety sensor 106 which accepts the glow component 106. For example, the glow component 106 and safety sensor 102 may have respective male and female components which allow the glow component 106 to be mated with the safety sensor 102. In other examples, the glow component 106 may be mounted on the safety sensor 102 using an adhesive. The adhesive may be double sided tape, where one side of the tape is affixed to the glow component and another side of the tape is affixed to the safety sensor, among other adhesives to facilitate affixing the glow component 104 to the safety sensor 102.

Figure 2:
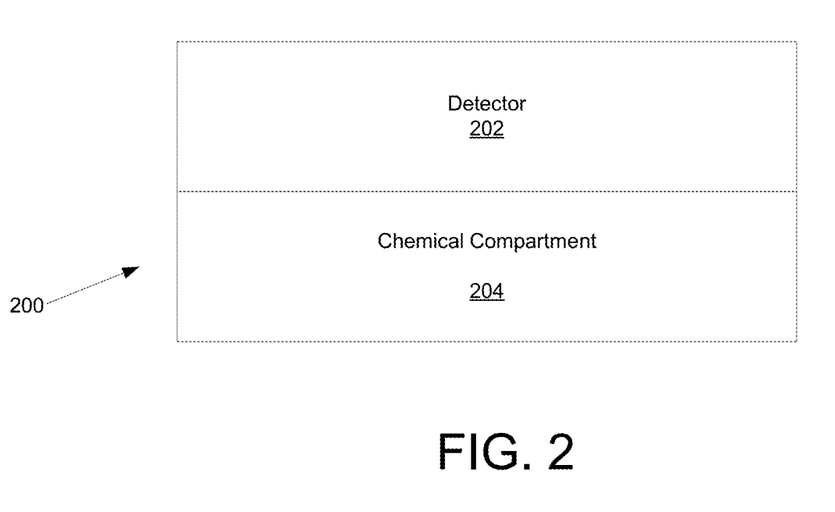
FIG. 2 shows an example arrangement of the glow component.

FIG. 2 shows an example arrangement 200 of the glow component. The arrangement 200 may comprise multiple components associated with indicating a waning power source of a safety sensor. The components may include a detector 202 and a chemical compartment 204.

The detector 202 may detect audio sound indicative of the power source of the safety sensor waning. The chemical compartment 204 may hold one or more chemicals that facilitate emission of light in a sonoluminescent manner via chemiluminescence (e.g., emission of light during a chemical reaction between two or more chemicals) and/or photoluminescence (e.g., emission of light by a chemical reacting to absorption of photons). Based on the detection of audio sound indicative of the power source of the safety sensor waning, the detector 202 may trigger the one or more chemicals in the chemical compartment 204 to react and emit light indicating a waning power source. Further, a color emitted as a result of the reaction may be distinguishable from other colors of lights on the safety sensor or of other electronic devices typically found in a home or business. The distinguishable color may facilitate the identification of the safety sensor with waning power source from other electronics in an environment.

In some examples, the reaction in the chemical compartment 204 may be reversible. For example, two or more chemicals in the chemical compartment 204 may react to form a luminous compound (e.g., chemical compound which emits light). The emission of light may stop when no more luminous compound is formed. However, the luminous compound may not be stable, and as a result eventually separate into its constituent chemicals. As a result, the reaction may be triggered again at some later time to again form the luminous compound and emit light. Accordingly, the reaction which causes the glowing may be reversible and repeatable.

As another example, one or more chemicals in the chemical compartment 204 may react to light produced by a light emitting diode (LED) in the chemical compartment to emit visible light. In some examples, the light may be an ultraviolet light (UV) turned on for a duration of time produced by an LED. The light may cause the one or more chemicals in the chemical compartment 204 to emit visible light for a period of time longer than the duration of time which the LED is powered to supplement the light emitted by the LED. The emission of light may stop when the reaction is complete. The reaction may be triggered again by turning on the light. Accordingly, this reaction which produces the light may also be reversible and repeatable. Further, power requirements may be lessened because the LED is only turned on for the duration while the reaction causes the visible light to be emitted for a period of time longer than the duration that the LED is turned on. To illustrate, the LED may be pulsed on and off every 5 seconds, and while the LED is off the one or more chemicals in the chemical compartment 204 continues to emit visible light until the LED is pulsed on again.

In yet other examples, the reaction in the chemical compartment 204 may not be reversible. For example, two or more chemicals may react, form a luminous compound, and emit light. However, once the reaction is complete, then light emission may cease and cannot be restarted. In this example, the luminous compound may be stable, and not separate into its constituent chemicals. Accordingly, the reaction which produces the light may not be reversible and repeatable.

The chemical compartment 204 itself may be formed (at least partially) of an opaque material so that light emitted within the chemical compartment 204 by the reaction is visible outside of the chemical compartment 204. Further, the opaque material may be doped, mixed, and/or coated with a chemical which also emits light based on a reaction, e.g., with the UV light. Further, in some examples, a light emitting material (not shown) may be positioned adjacent to the chemical compartment 204, e.g., on an inside or outside of the chemical compartment 204, and/or integral with the chemical compartment 204. The light emitting material may be opaque as well, e.g., a plastic, or an encapsulated liquid, e.g., water or hydrogen peroxide or a gaseous material. The light emitting material may include a lens to focus and/or disperse the light produced by the reaction to make the light more visible.

Figure 3:
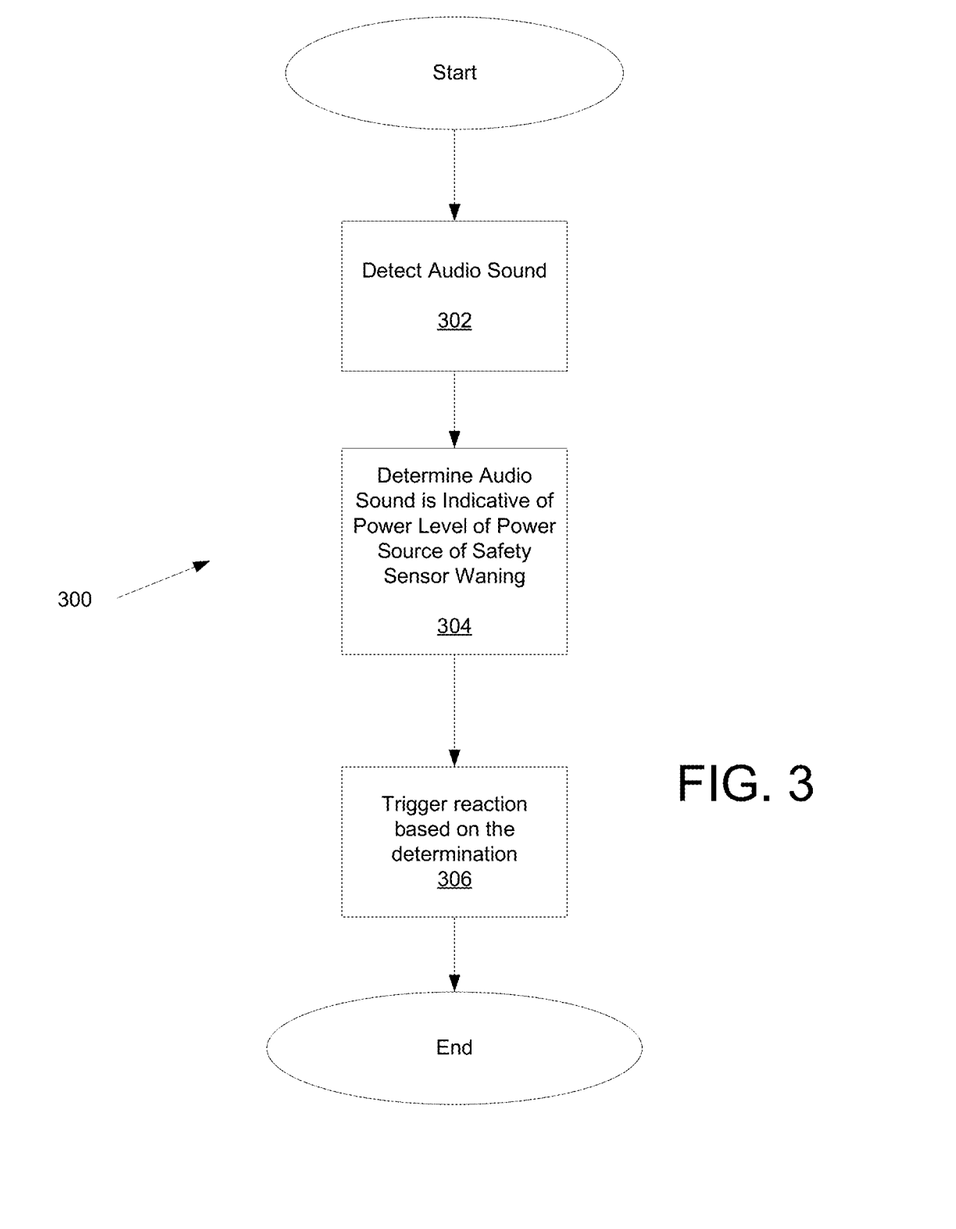
FIG. 3 is a flow chart of functions associated with indicating a waning power source of a safety sensor.

FIG. 3 is a flow chart of functions 300 associated with indicating a waning power source of a safety sensor. Briefly, at 302, audio sound may be detected. At 304, a determination is made whether the detected audio sound is indicative of a power level of a power source of the safety sensor. At 306, a reaction is triggered based on the determination. The functions may be performed by one or more of the detector in conjunction with the chemical compartment of the glow component.

Referring back, at 302, the detector may be an electronic circuit which detects audio sound. The detector may detect audio sound in a certain frequency range, such as an audible range from 0 to 20 kHz. The detector may include a microphone, or a surface acoustic wave sensor which converts audio sound into an electrical signal. Additionally, or alternatively, the detector may include a vibration sensor which detects mechanical vibration imparted to a housing of the safety sensor to which the glow component is affixed when the safety sensor outputs audio sound. The vibration sensor may also output an electrical signal indicative of detected mechanical vibration.

At 304, a determination is made whether the detected audio sound is indicative of a power level of a power source of the safety sensor waning, e.g., power source decreasing below a threshold level such that the safety sensor may not operate and/or reliably operate. For example, the detector may have circuitry for applying a bandpass filter to the electrical signal with a pass band around a predetermined frequency or predetermined range of frequencies. The predetermined frequency or predetermined range of frequencies may be indicative of one or more frequencies of the audio sound output by a safety sensor when indicating a power level of a power source waning. For example, the predetermined frequency or predetermined range of frequencies may be 520 Hz associated with an audible "chirp." If a signal output by the bandpass filter is above a threshold level, then the safety sensor may be determined to have output audio sound indicative of a power level of the power source waning. The detector may output a signal indicative of the determination. If a signal output by the bandpass filter is not above the threshold level, then the safety sensor may be determined to not have output audio sound indicative of a power level of the power source waning and not output a signal indicative of the determination. Other variations are also possible for detecting the audio sound indicative of a power level of a power source.

The audio sound indicative of the power level of the safety sensor may be periodic in nature. An example of this audio sound may be a periodic chirp emitted by a smoke detector when its battery wanes. The periodicity may be, for example, in a range of 30 to 90 seconds, among other durations. As a result, the detector may have an electronic timer which also measures a periodicity of the signals output by the bandpass filter over a period of time. If the periodicity matches a predefined periodicity, then the detector may output a signal that indicates the power level of the power source waning. If the periodicity does not match a predefined periodicity, then the detector may not output a signal that indicates the power level of the power source waning.

At 304, a reaction is triggered based on the signal output by the detector. The reaction may produce a visible indication, e.g., light, that the power source is waning.

For example, one or more chemicals separately stored in the chemical compartment may be mixed to form a luminous compound. The chemicals may include one or more of hydrogen peroxide, diphenyl oxalate, or luminol. Atoms in the luminous compound may be excited and glow. Further, the luminous compound may glow for a period of time. After a period of time, the reaction may stop and the luminous compound may no longer glow.

Figure 4:
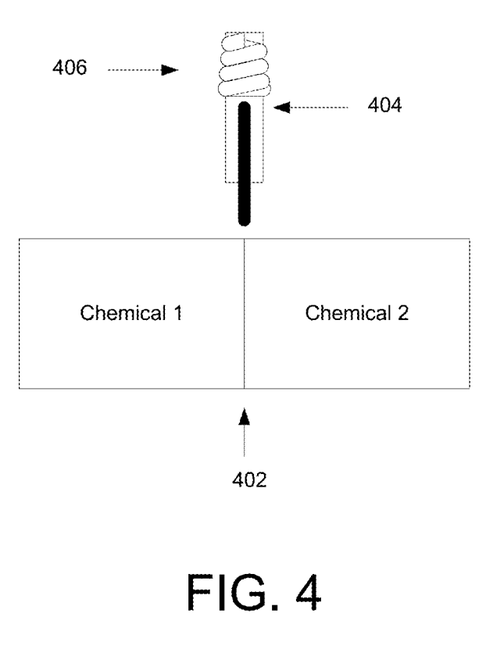
FIG. 4 illustrate a mixing process for forming a luminous compound.

FIG. 4 illustrate an example of this mixing process. A barrier 402 such as a synthetic polymeric membrane may initially separate a first and second chemical in the chemical compartment. The barrier may prevent the first and second chemicals from mixing. The first chemical and second chemical may be mixed by removing a barrier which separates the first chemical and the second chemical. For example, a ram 404 may pushed to the barrier 402 causing the barrier to break. The ram 404 may be activated by the signal output by the detector indicative of the power level of the power source of the safety sensor waning and pushed to the barrier via an electromagnet. The ram 404 may also have a spring 406 which causes the ram 404 to return to a resting position after breaking the barrier 402. The barrier 402 may be broken in yet other ways as well.

Figure 5A:
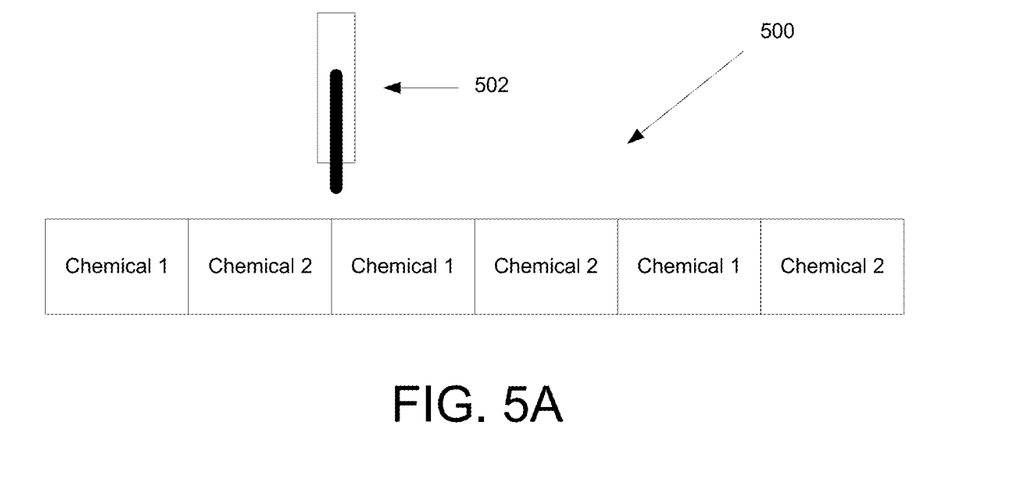
FIGS. 5A and 5B illustrate different arrangements of a plurality of instances of chemicals for forming the luminous compound.
Figure 5B:
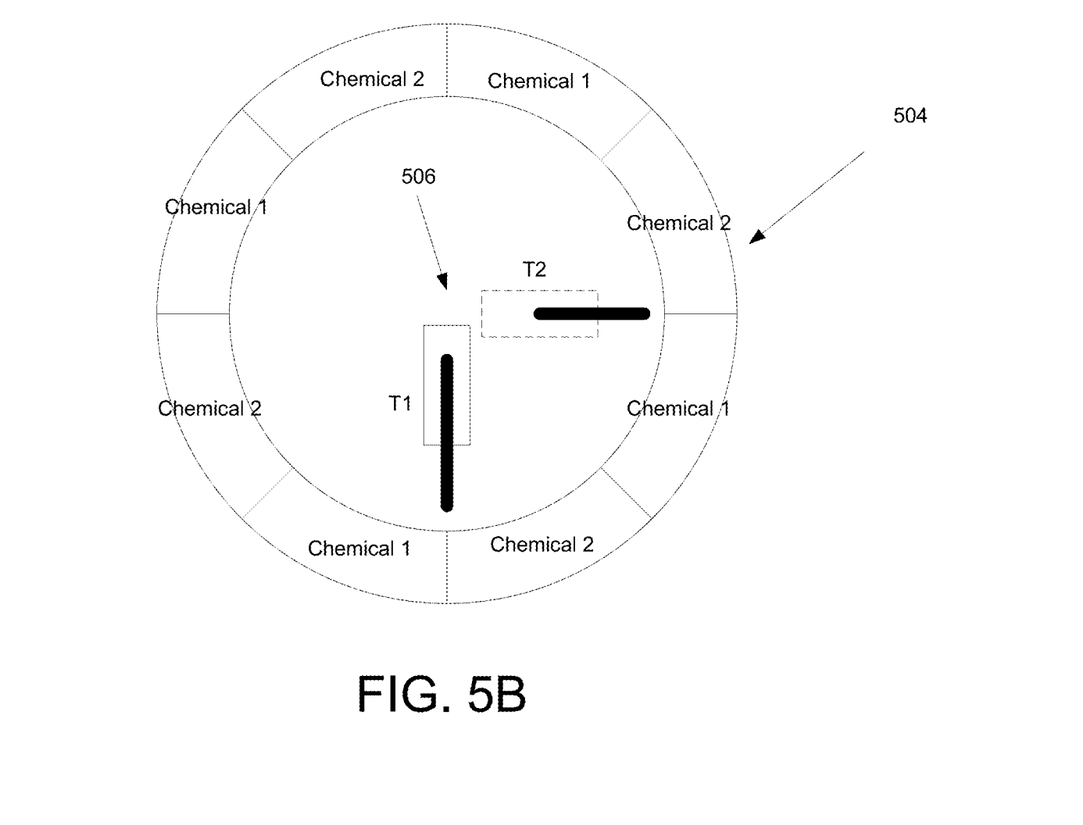

In the case the reaction is not reversible, the luminous compound may have a plurality of instances of the first and second chemical each separately encapsulated and arranged adjacent to each other. FIGS. 5A and 5B illustrate different examples of these plurality of instances.

In FIG. 5A, the plurality of instances 500 may be linearly arranged. After a barrier is broken for an instance of the first and second chemical, e.g., by the ram 502, then the plurality of instances 500 and/or the ram 502 may move so that another instance of the first and second chemical with an intact barrier is aligned with the ram 502. An electric motor (not shown) may cause the movement. Then, when the ram 502 is activated again a force may cause the barrier to break.

In FIG. 5B, the plurality of instances 508 may be circularly arranged. After a barrier is broken for an instance of the first and second chemical, e.g., by the ram 506, at time T1, then the plurality of instances 504 and/or the ram 506 may move so that another instance of the first and second chemical with an intact barrier is aligned with the ram at time T2. Then, when the ram is activated the force may cause the barrier to break. Again, the electric motor may cause the movement.

The glow component may be able to emit light a separate number of times based on a number of the plurality of instances of the first and second chemical separated by the barrier. FIG. 5A shows three example instances and FIG. 5B shows four example instances. To prevent using up the separate instances in a short period of time, the detector may be arranged to only break another barrier after a predetermined time after a barrier was previously broken. Assuming that a power source, e.g., battery, is replaced after the light is emitted, the predetermined time may be set based on an average life expectancy of the battery. An electronic timer may indicate passage of time after one barrier is broken before another barrier is broken.

In another example, the chemical compartment may have a quinine solution. In some examples, the quinine solution may be water mixed with quinine. Additionally, an LED may be submerged in the chemical compartment with the quinine solution. Based on the signal output by the detector indicative of the power level of the power source waning, the LED may emit ultraviolet light. Quinine in the quinine solution may react to the ultraviolet light by absorbing the light at 250 nm and 350 nm and emitting visible light at 450 nm in the form of a bluish color.

The LED may be powered by the same power source which is waning or another power source, e.g., button battery. Powering an LED with an intensity bright enough to provide the visual identification may be power intensive. In this regard, power requirements for providing the visual identification could be lessened by emitting light via the reaction with quinine rather than solely relying on an LED to produce visible light. Further, in some examples, the opaque material which forms the chemical compartment may be mixed, coated, and/or doped with chemicals which react to the UV light. This reaction may also supplement the light emission.

Figure 6:
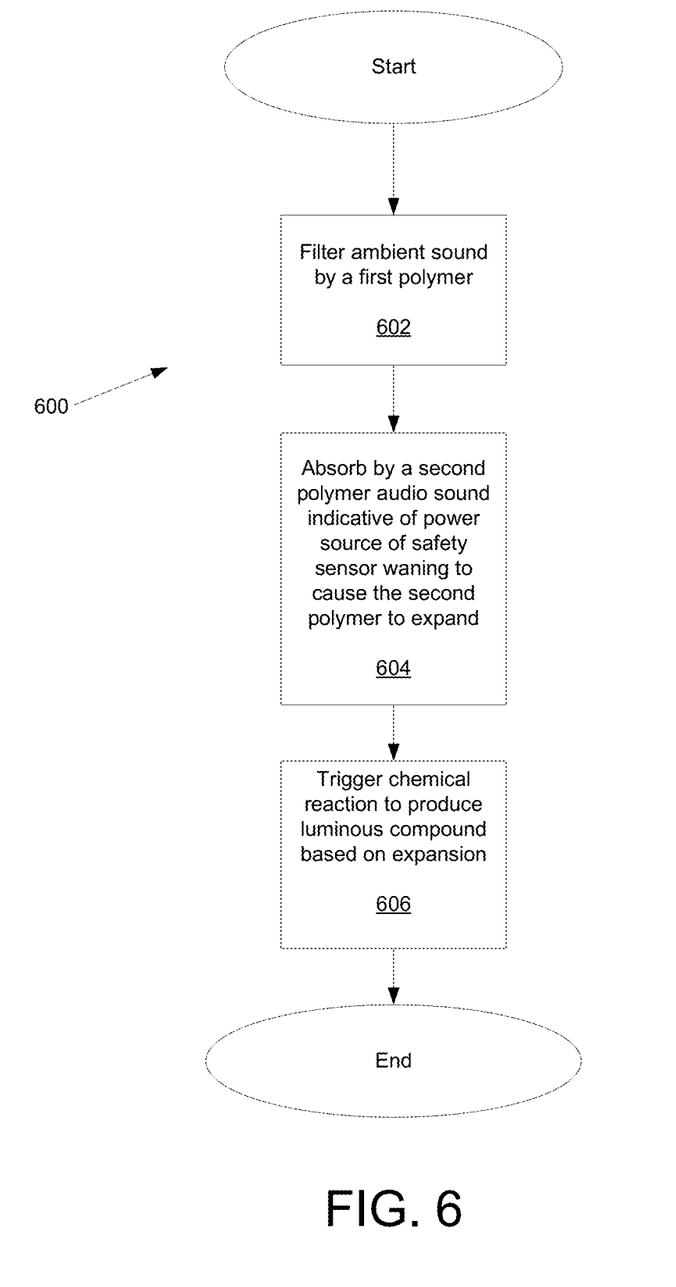
FIG. 6 is another flow chart of functions associated with indicating a waning power source of a safety sensor.

FIG. 6 is another flow chart of functions 600 associated with indicating a power level of a power source of a safety sensor. Unlike, the functions 300 described with respect to FIG. 3, the functions 600 may be based on use of one or more polymers. Briefly, at 602, ambient sound may be filtered by a first polymer. At 604, sound is absorbed by a second polymer indicative of a power source of a safety sensor waning which causes the second polymer to expand. At 606, a reaction is triggered based on the expansion to produce a luminous compound in a chemical compartment. Further, the first polymer may be a same polymer or different polymer than the second polymer.

Referring back, at 602, ambient sound may be filtered by a first polymer. The first polymer may take the form of a refractory polymer such as polyurethane which refracts ambient sound in an environment where the glow component is located except for that sound associated with a power level of the power source of the safety sensor waning. For example, the first polymer may refract sound except for the audible sound in the predetermined frequency or range of frequencies associated with the waning power source.

The first polymer may be adjacent to a second polymer which may take the form of an elastic polymer. At 604, the elastic polymer such as neoprene may absorb the sound which is not refracted by the refractory polymer which causes the elastic polymer to expand. In this regard, if the elastic polymer expands, then the audio sound detected is indicative of a power level of a power source of the safety sensor, e.g., the power source waning. If the elastic polymer does not expand, then the audio sound detected is not indicative of a power level of a power source of the safety sensor, e.g., the power source not waning.

At 606, the expansion may cause two or more chemicals to react. In some cases, the reaction may produce a luminous compound in the chemical compartment.

In one example, the chemical compartment may facilitate combining one or more first chemicals with one or more second chemicals. In one case, the one or more first chemicals may take the form of a quinine solution and the one or more second chemicals may take the form of a luminescent powder such as strontium aluminate or luminol which causes emission of visible light. In another case, the one or more first chemicals may take the form of hydrogen peroxide and the one or more second chemicals may take the form of diphenyl oxalate or luminol. The one or more second chemicals may be stored in a porous material adjacent to the elastic polymer to be injected into the chemical compartment having one or more first chemicals (or vice versa). Then, the expansion of the elastic polymer may push against the porous material causing the one or more second chemicals to be injected into the one or more first chemicals. The injection may result in a reaction which emits light. Other chemicals may also be used and in some cases the porous material may alternatively store a solid chemical which is injected into a liquid chemical.

In another example, the chemical compartment may have a first and second chemical each separately encapsulated and arranged adjacent to each other, similar to those arrangements shown in FIGS. 4 and 5. For example, the first chemical may be hydrogen peroxide and the second chemical may be diphenyl oxalate or luminol. The expansion of the elastic polymer may cause the two chemicals to mixed, forming a luminous compound which in turn emits light. For example, expanding elastic polymer may push against the ram, causing the ram to be pushed against the barrier breaking it. In this regard, the expansion of the elastic polymer may cause the ram to move rather than an electromagnet, for example, as described above.

FIGS. 7-10 show various arrangements of the glow component in accordance with the described examples.

Figure 7:
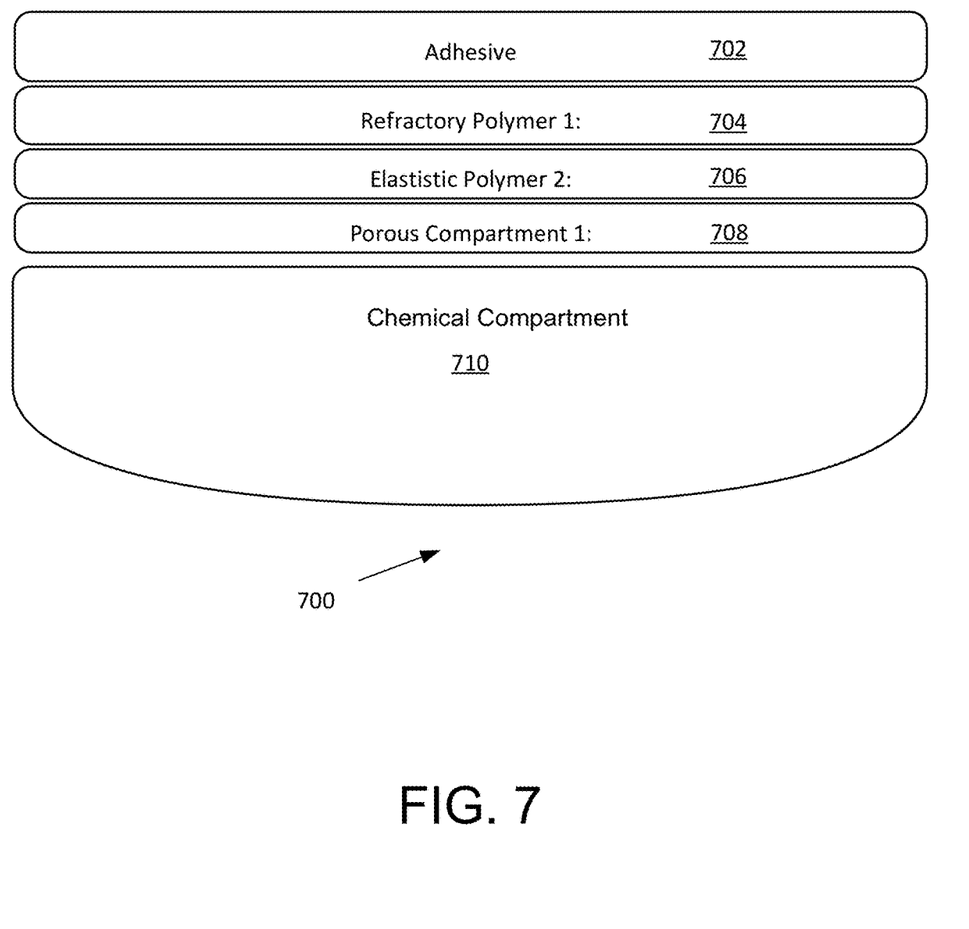
FIG. 7 is an example glow component with an arrangement of polymers which are arranged to cause the glow component to emit light.

FIG. 7 is an example glow component with an arrangement 700 of polymers which are arranged to cause the glow component to emit light based on chemiluminescence or more specifically lyoluminescence. Lyoluminescence is a process of dissolving a solid into a liquid solvent to produce light. The arrangement 700 may have an adhesive 702, a refractory polymer 704, an elastic polymer 706, a porous compartment 708 and a chemical compartment 710. The adhesive 702 may facilitate attaching the glow component to the safety sensor. The refractory polymer 704 may filter ambient sound except for the audible sound indicative of a power source of the safety sensor waning. The elastic polymer 706 may absorb sound passing through the refractory polymer 706 which causes it to expand. The expanding polymer 706 may compress a porous material storing one or more chemicals in the porous compartment 708. The expansion may compress the porous material causing the one or more chemicals in the porous material to be injected into the chemical compartment 710 which is opaque. For example, a solvent (liquid) such as hydrogen peroxide may be injected into a solute (solid) such as luminol. The injection may result in a reaction to produce light. In other examples, the expanding polymer may cause the ram in FIGS. 4 and/or 5 to break the barrier such as an insoluble porous membrane which results in mixing of chemicals to form a luminous compound.

Figure 8:
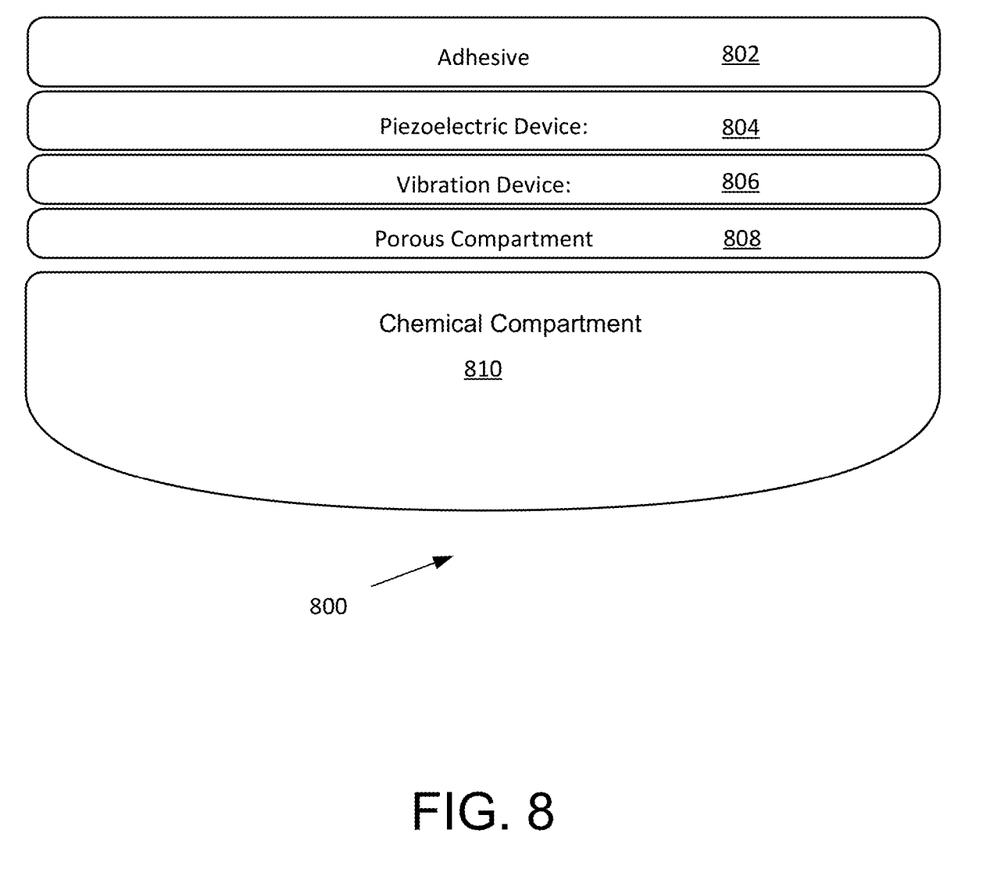
FIG. 8 is an example glow component with a piezoelectric device arranged to cause the glow component to emit light.

FIG. 8 is another example glow component with an arrangement 800 of an adhesive 802, piezoelectric device 804, a vibration device 806, a porous compartment 808 and chemical compartment 810. The adhesive 802 may facilitate attaching the glow component to the safety sensor. The piezoelectric device 804 may be a material tuned to respond to sound pressure associated with audio sound indicative of the power source of the safety sensor waning by producing an electrical signal. The electrical signal may power the vibration device 806 which converts the electrical signal to a mechanical oscillation. The vibration may vibrate a porous material storing one or more chemicals in the porous compartment 808 causing the one or more chemicals in the porous material to be injected into the chemical compartment 810. For example, a solvent (liquid) such as hydrogen peroxide may be injected into a solute (solid) such as luminol. The injection may result in a reaction to produce light. In other examples, the vibration may cause the ram in FIGS. 4 and/or 5 to break the barrier such as an insoluble porous membrane which results in mixing of chemicals to form a luminous compound.

Figure 9:
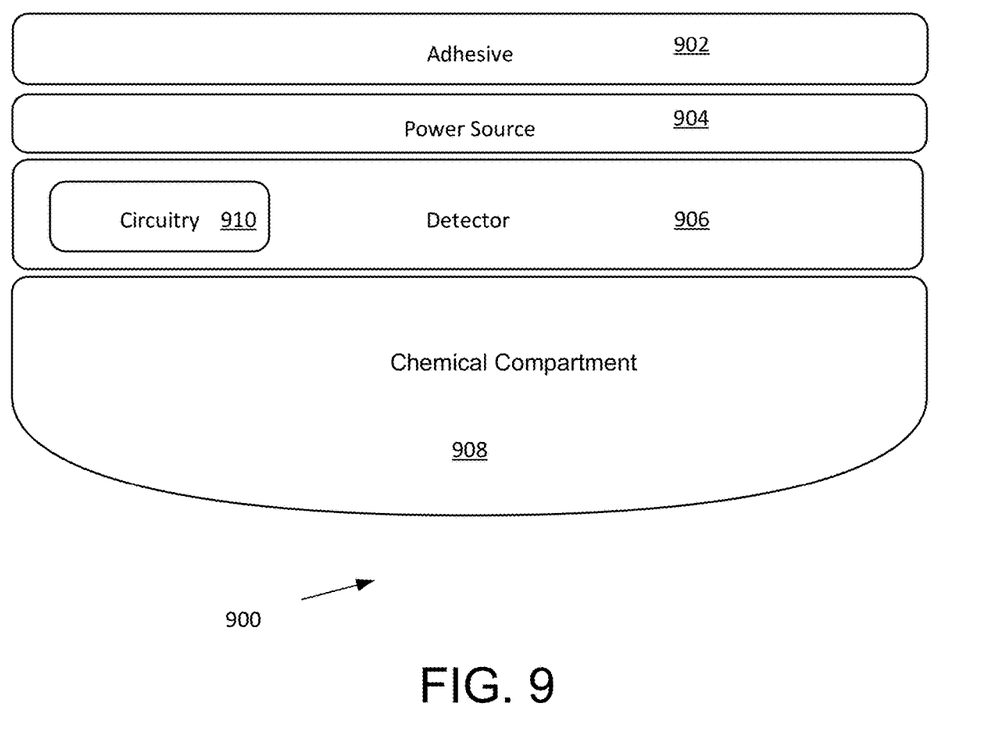
FIG. 9 is an example glow component with an arrangement of electrical components which are arranged to cause the glow component to emit light.

FIG. 9 is an example glow component with an arrangement 900 of electrical components which are arranged to cause the glow component to emit light. The arrangement 900 may include an adhesive 902, a power source 904, a detector 906, and a chemical compartment 908. The adhesive 902 may facilitate attaching the glow component to the safety sensor. The power source 904 may power the detector 906. The power source 904 may take the form of a button battery, solar panel, and/or the power source of the safety sensor itself. The detector 906 may have circuitry 910 to detect audible sound indicative of a power source of the safety sensor waning. The circuity 910 may take the form of hardware, software, or a combination of hardware and software. Based on the detection, the detector 906 may cause a reaction in the chemical compartment 908. For example, the detector 906 may arrange for the power source 904 to power one or more of the electromagnet associated with the ram and/or electric motor associated with FIGS. 4 and 5 to mix two or more chemicals in the chemical compartment 908 which results in emission of light. Other variations are also possible.

Figure 10:
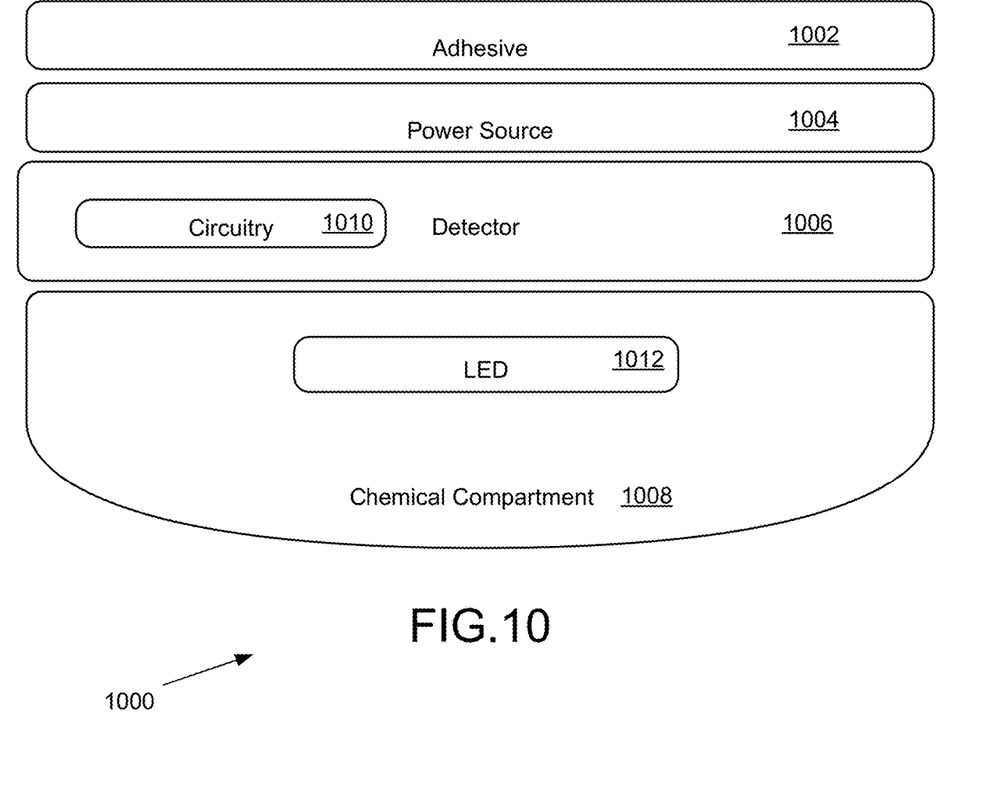
FIG. 10 is another example glow component with an arrangement of electrical components which are arranged to cause the glow component to emit light.

FIG. 10 is another example glow component with an arrangement 1000 of electrical components which are arranged to cause the glow component to emit light based on photoluminescence. The arrangement 1000 may include the adhesive 1002, power source 1004, detector 1006, chemical compartment 1008 having one or more chemicals, and circuit board 1010. However, the arrangement 1000 may also include an LED 1012 powered by the power source 1004 which is submerged in the one or more chemicals. Upon detecting audio sound associated with a waning power source, the detector 1006 may cause the power source 905 to power the LED and emit an ultraviolet light. The one or more chemicals in the chemical compartment 1008 may include a quinine solution. The quinine in the quinine solution may react to the ultraviolet light by absorbing the light at 250 nm and 350 nm and emitting visible light at 450 nm in the form of a bluish color. Additionally, or alternatively, the chemical compartment may be made of an opaque material whose inner and/or outer surface is coated and/or doped in strontium aluminate which reacts to the UV light. The emission of light may be based on phosphorescence where visible light continues to be emitted by the opaque material for some time after the LED stops emitting UV light. This way the chemical compartment may glow even if there is no power remaining in the power source to power the LED or if the detector 906 causes the power source 904 to periodically power the LED rather than continuously powering the LED. Still additionally, or alternatively, the chemical compartment may be made of an opaque material whose inner and/or outer surface is coated and/or doped with a florescent chemical such as phosphor. The emission of light may be based on florescence where visible light is emitted by the opaque material in response to the UV light, but cease to emit light when the LED ceases to output UV light.

In some examples, one or more of the arrangements in FIGS. 7-10 may be combined together to form a hybrid glow component which can be affixed to the safety sensor. For example, light may be produced in the chemical compartment as a result of mixing two or more chemicals in addition to the light emitted by the LED and/or by phosphorescence. Other variations are also possible.

Figure 11:
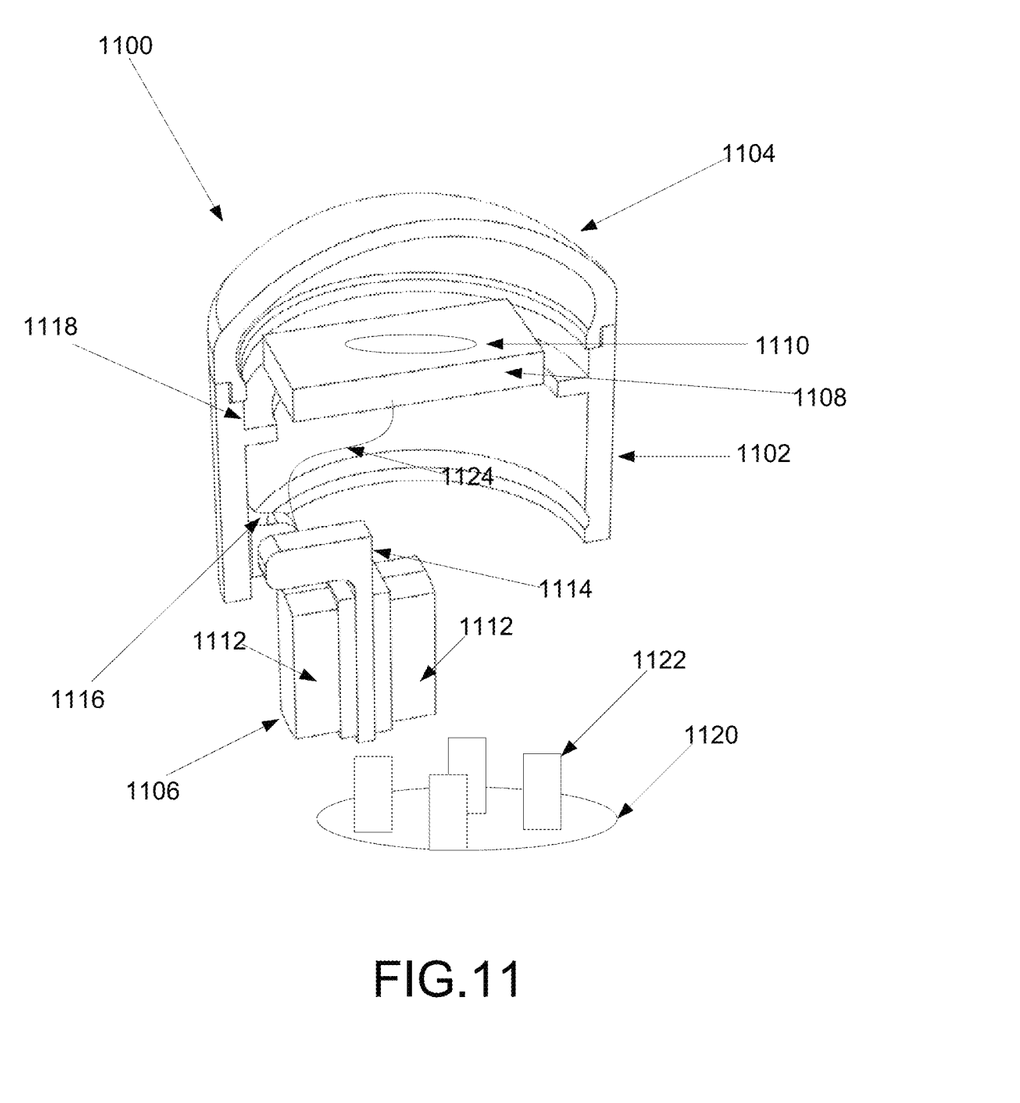
FIG. 11 illustrates an example packaging of the glow component.

FIG. 11 illustrates an example cross section 1100 of packaging of the glow component in accordance with the arrangement of FIG. 10. The packaging may include a body 1102 and a dome 1104. The body 1102 may house components of the glow component including the power source 1106, detector 1108, and LED 1110. The power source 1106 may take the form one or more button batteries which are mounted onto a platform 1114 which can swing into and out of the body 1102 via a hinge 1116. The power source 1106 may power the detector 1108 and LED 1110 via a connection 1124 such as a flexible wire. The detector 1108 may include circuitry for detecting sound indicative of a waning power source. In response, the detector 1108 may power the LED 1110. The dome 1104 may be made of an opaque material which causes the glow component to emit light when the LED 1112 is powered. Additionally, in some cases, the dome 1104 may contains and/or be coated with a chemical that causes light to be emitted based on florescence when the LED 1112 is powered on and/or based on a phosphorescence even after the LED 1112 stops being powered.

One or more of the detector 1108 and LED 1100 may be supported by a lip 1118 which runs around at least a portion of an inner surface of the body 1102. Further, the glow component may mate with a connector 1120 on the safety sensor (not shown) to facilitate attaching the glow component to the safety sensor. The connector 1120 may be mounted to the safety sensor via an adhesive and designed with one or more prongs 1122 which facilitates repeatedly attaching and removing the glow component from the safety sensor.

In some examples, the packaging 1110 may be modified to house components associated with other structures of the glow component that are shown in FIGS. 7-9. For instance, the power source 1106, detector 1108, and/or LED 1110 may be removed in the structures and the body 1102 may contain the one or more layers that achieve visual indication of a waning power source. Other variations are also possible.

The examples described above describe the glow component emitting light as a result of detecting audio sound indicative of the power source of the safety sensor waning where initially the glow component was not emitting light. In other examples, the glow component may be arranged to initially emit light of a first color before detecting audio sound indicative of the power source of the safety sensor waning and based on the functions and structures described above emit light of a second color as a result of detecting audio sound indicative of the power source of the safety sensor waning. For example, the chemical compartment may inherently emit light whose color is changed by a subsequent chemical reaction. The light emitted by the glow component may take other forms as well.

Additionally, the examples described herein are directed to detecting a waning power source of safety sensors. Devices other than safety sensors may have power sources that wane. These waning power sources can be detected in a manner similar to how the waning power source of safety sensors is detected.

The description above discloses, among other things, various example systems, methods, apparatus, and articles of manufacture including, among other components, firmware and/or software executed on hardware. It is understood that such examples are merely illustrative and should not be considered as limiting. Accordingly, the examples provided are not the only way(s) to implement such systems, methods, apparatus, and/or articles of manufacture. Further, details well known and widely used in the process of manufacturing miniaturized electronic devices (e.g., plastic injection molding, techniques for assembling electronic components, techniques for affixing a first device (e.g., glow component) to the outside housing of a second device (e.g. smoke detector, etc.)) and miscellaneous components have been omitted, so as not to unnecessarily obscure the present invention.

Additionally, references herein to "embodiment" or "example" means that a particular feature, structure, or characteristic described in connection with the embodiment or example can be included in at least one example or embodiment of an invention. The appearances of this phrase in various places in the specification are not necessarily all referring to the same embodiment or example, nor are separate or alternative embodiments or examples are mutually exclusive of other embodiments or examples. As such, the embodiments or example described herein, explicitly and implicitly understood by one skilled in the art, can be combined with other embodiments or examples.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments.

Further, a reference to a component of the invention in the singular may also include a plurality of the same component. For example, reference to a chemical in the singular may not be limited to a single chemical but may include a plurality of chemicals and/or compounds. To the extent that embodiments described above relate to use of an LED to output light, other light emitting devices may also be used in place of or in addition to LEDs including florescent lights, incandescent light, halogen lights, metal halide lights, neon lights, etc.

Example Embodiments

Example embodiments include the following:

Embodiment 1: A method comprising: detecting an audio sound; determining that the audio sound is indicative of a power source of a safety sensor waning; and based on the determination, producing first light based on one or more chemicals reacting with second light from a light emitting diode (LED), wherein the first light supplements the second light.

Embodiment 2: The method of Embodiment 1, wherein the first light is florescence light; and wherein producing the first light comprises producing the florescence light based on the one or more chemicals reacting with the second light from the LED.

Embodiment 3: The method of Embodiment 1 or 2, wherein the first light is phosphorescence light; and wherein producing the first light comprises producing the phosphorescence light based on the one or more chemicals reacting with the second light from the LED.

Embodiment 4: The method of any one of Embodiments 1-3, wherein the second light is ultraviolet (UV) light; wherein the LED is submerged in the one or more chemicals; and wherein producing the first light comprises the one or more chemicals reacting with the UV light.

Embodiment 5: The method of any one of Embodiments 1-4, wherein producing the first light comprises periodically activating an LED for a first period of time which causes the one or more chemicals to emit the first light based on phosphorescence for a second period of time, wherein first period of time is less than the second period of time.

Embodiment 6: The method of any one of Embodiments 1-5, wherein determining that the audio sound is indicative of the power source of the safety sensor waning comprises detecting that a signal output by a filter exceeds a threshold level.

Embodiment 7: An integrated glow component structure comprising: a power source; a light emitting diode (LED); a detector arranged to detect audio sound output by a safety sensor, determine whether the audio sound is indicative of a power source waning, and power on the LED via the power source; and a chemical compartment comprising one or more chemicals for producing first light based on a reaction with second light emitted from the powered on LED, wherein the first light supplements the second light.

Embodiment 8: The integrated glow component structure of Embodiment 7, wherein the one or more chemicals is a quinine solution; and wherein the chemical compartment comprises the LED submerged in the quinine solution.

Embodiment 9: The integrated glow component structure of Embodiment 7 or 8, wherein the one or more chemicals is a florescent material; and wherein the LED causes the florescent material to emit the first light while the LED is powered on.

Embodiment 10: The integrated glow component structure of any one of Embodiments 7-9, wherein the power source comprises one or more batteries arranged on a platform with a hinge that swings into and out of a body of the integrated glow component structure.

Embodiment 11: The integrated glow component structure of any one of Embodiments 7-10, wherein the audio sound output by the safety sensor is a 520 Hertz square wave.

Embodiment 12: The integrated glow component structure of any one of Embodiments 7-11, wherein the one or more chemicals is strontium aluminate; and wherein the LED causes the strontium aluminate to emit the first light for a period of time longer than a time that the LED is powered by the power source.

Embodiment 13: The integrated glow component structure of any one of Embodiments 7-12, wherein the chemical compartment is opaque.

Embodiment 14: The integrated glow component structure of any one of Embodiments 7-13, wherein the powered on LED emits ultraviolet light.

Embodiment 15: The integrated glow component structure of any one of Embodiments 7-14, wherein the integrated glow component structure comprises a body, and wherein a lip inside the body of the integrated glow component supports the detector and LED within the body.

Embodiment 16: A system comprising: a safety sensor; a glow component comprising: a power source; a light emitting diode (LED); a detector arranged to detect audio sound output by a safety sensor, determine whether the audio sound is indicative of a power source waning, and power on the LED via the power source; a chemical compartment comprising one or more chemicals for producing first light based on a reaction with second light emitted from the powered on LED, wherein the first light supplements the second light; and a connector for mounting the glow component onto the safety sensor.

Embodiment 17: The system of Embodiment 16, wherein the second light is UV light; wherein the one or more chemicals is a quinine solution; wherein the LED is submerged in the quinine solution; and wherein the reaction of the UV light with the quinine solution produces the first light.

Embodiment 18: The system of Embodiment 16 or 17, wherein the one or more chemicals is strontium aluminate; wherein an inner surface of the chemical compartment is coated with the strontium aluminate; and wherein the strontium aluminate produces the first light based on phosphorescence in response to reacting with the second light emitted by the powered on LED.

Embodiment 19: The system of Embodiments 16-18, wherein the connector is mounted to the safety sensor via an adhesive; and wherein the connector comprises one or more prongs to facilitate repeatedly attaching and removing the glow component from the safety sensor.

Embodiment 20: The system of Embodiments 16-19, wherein the one or more chemicals is a florescent material; wherein an inner surface of the chemical compartment is coated with the florescent material; and wherein the florescent material produces the first light based on florescence in response to reacting with the second light emitted by the powered on LED.

What is claimed is:

1. A system for indicating a waning status of a power source, said system comprising:
    an audio source powered by the power source, the audio source configured to provide audio sound output characteristic of the waning status;
    a glow component comprising:
        a light emitting diode (LED) operable to emit first light,
        a chemical component operable to produce second light, the chemical component when exposed to the first light operable to produce the second light in relation to an activating reaction of the chemical component when exposed to the first light;
    a detector configured to detect the audio sound output, said detector including a processor configured to determine whether the audio sound is indicative of the power source waning, the detector configured to cause operation of the LED to emit the first light.

2. The system of claim 1, further comprising:
a connector for mounting the glow component to a sensor including the audio source.

3. The system of claim 1, further comprising:
said glow component operable to produce the second light in a second light period extending longer than the first light.

4. The system of claim 1, further comprising:
the power source in communication with a sensor to power operation of the sensor.

5. The system of claim 2, further comprising:
the connector configured to facilitate repeatedly attaching and removing the glow component from the safety sensor.

6. The system of claim 1, further comprising:
the chemical component including florescent material producing the second light by florescence.

7. The system of claim 6, further comprising:
the florescent material producing the second light by florescence.

* * * * *